United States Patent
Lim et al.

(10) Patent No.: US 9,336,947 B2
(45) Date of Patent: May 10, 2016

(54) DIELECTRIC COMPOSITION FOR LOW-TEMPERATURE SINTERING, MULTILAYER CERAMIC ELECTRONIC COMPONENT INCLUDING THE SAME, AND METHOD OF MANUFACTURING MULTILAYER CERAMIC ELECTRONIC COMPONENT

(71) Applicant: SAMSUNG ELECTRO-MECHANICS CO., LTD., Suwon, Gyunggi-do (KR)

(72) Inventors: Jong Bong Lim, Gyunggi-do (KR);
Seok Hyun Yoon, Gyunggi-do (KR);
Doo Young Kim, Gyunggi-do (KR);
Sang Huk Kim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 165 days.

(21) Appl. No.: 14/066,412

(22) Filed: Oct. 29, 2013

(65) Prior Publication Data
US 2015/0029637 A1 Jan. 29, 2015

(30) Foreign Application Priority Data
Jul. 23, 2013 (KR) .................. 10-2013-0086919

(51) Int. Cl.
*C04B 35/468* (2006.01)
*H01G 4/12* (2006.01)

(52) U.S. Cl.
CPC .......... *H01G 4/1227* (2013.01); *C04B 35/4682* (2013.01)

(58) Field of Classification Search
CPC ..................... C04B 35/4682; H01G 4/1227
See application file for complete search history.

(56) References Cited

U.S. PATENT DOCUMENTS

| | | | | |
|---|---|---|---|---|
| 3,920,584 A | * | 11/1975 | Vitriol | ............ 252/514 |
| 4,897,249 A | * | 1/1990 | Ross | ........ C01B 35/126 |
| | | | | 423/279 |
| 6,251,816 B1 | * | 6/2001 | Maher et al. | ........... 501/138 |
| 2002/0037804 A1 | * | 3/2002 | Sugimoto et al. | ....... 501/139 |
| 2006/0087796 A1 | * | 4/2006 | Yamazaki et al. | ........ 361/321.2 |
| 2007/0254799 A1 | * | 11/2007 | Kaneda et al. | ............. 501/139 |
| 2009/0128988 A1 | | 5/2009 | Sohn et al. | |

(Continued)

FOREIGN PATENT DOCUMENTS

| | | |
|---|---|---|
| JP | 2001-089231 A | 4/2001 |
| KR | 20090050665 A | 5/2009 |

OTHER PUBLICATIONS

H. Jeon et al. "Effects of BaO—B2O3—SiO2 glass additive on densification and dielectric properties of BaTiO3 ceramics", Materials Chemistry and Physics, vol. 94, Iss. 2-3, Dec. 15, 2005, pp. 185-189.

(Continued)

*Primary Examiner* — Karl Group
(74) *Attorney, Agent, or Firm* — McDermott Will & Emery LLP

(57) ABSTRACT

There is provided a dielectric composition for low-temperature sintering including $BaTiO_3$ as a main ingredient, and $xB_2O_3$-$(1-x)BaO$ as an accessory ingredient, wherein x ranges from 0.25 to 0.8, and the content of the accessory ingredient ranges from 0.1 to 2.00 mol %, based on 100 mol % of the main ingredient.

8 Claims, 5 Drawing Sheets

(56) References Cited

U.S. PATENT DOCUMENTS

2010/0069222 A1* 3/2010 Sohn et al. ............... 501/65
2012/0057271 A1* 3/2012 Oh et al. ............... 361/321.2
2013/0196159 A1* 8/2013 Oh et al. ............... 428/402

OTHER PUBLICATIONS

Korean Office Action dated Oct. 14, 2014, issued in corresponding Korean Application No. 10-2013-0086919. (English Translation).

* cited by examiner

A-A'

DIELECTRIC COMPOSITION FOR LOW-TEMPERATURE SINTERING, MULTILAYER CERAMIC ELECTRONIC COMPONENT INCLUDING THE SAME, AND METHOD OF MANUFACTURING MULTILAYER CERAMIC ELECTRONIC COMPONENT

CROSS-REFERENCE TO RELATED APPLICATION

This application claims the benefit of Korean Patent Application No. 10-2013-0086919 filed on Jul. 23, 2013, with the Korean Intellectual Property Office, the disclosure of which is incorporated herein by reference.

BACKGROUND OF THE INVENTION

1. Field of the Invention

The present invention relates to a dielectric composition for low-temperature sintering and a multilayer ceramic electronic component including the same.

2. Description of the Related Art

Recently, in accordance with miniaturization of electronic products using a multilayer ceramic capacitor (MLCC) and improvement in performance of the electronic products, the multilayer ceramic capacitor used in the electronic products has been miniaturized and capacitance of the multilayer ceramic capacitor has increased.

That is, in accordance with a demand for super-miniaturized and ultra-high capacitance MLCC, ceramic layers for implementing capacitance have been thinned and have been highly stacked. Therefore, high reliability MLCCs as well as stable capacitance implementation and a low loss factor of the MLCC have been demanded.

In order to secure super capacitance in a small-sized MLCC, a dielectric layer should be formed as an ultra-thin layer.

In order to obtain high reliability while having high capacitance and a low loss factor in the ultra-thin layer, a dielectric composition having excellent dielectric properties may be important, but connectivity of an internal electrode formed in a form in which the internal electrode and the dielectric layer are alternately stacked may also be important.

In the case of manufacturing a multilayer ceramic condenser using a dielectric material containing $BaTiO_3$, when a sintering temperature exceeds 1200° C., a nickel internal electrode is shrunk to thereby be aggregated. In this case, stress may be generated in the multilayer ceramic condenser due to a difference in shrinkage behavior of the internal electrode and the dielectric layer.

In addition, as the nickel internal electrode is shrunk and agglomerated, possibility that a short-circuit may be generated is rapidly increased, and connectivity or coverage of the electrode may be decreased due to oxidation of the internal electrode, thereby decreasing capacitance.

Further, reliability thereof may be deteriorated due to a decrease in insulation resistance at a high temperature (>1200° C.) in addition to a decrease in capacitance.

Therefore, a dielectric composition capable of being sintered at a low temperature of 1200° C. or less has been required.

The invention disclosed in the following Related Art Document relates to a dielectric ceramic composition and an electronic component.

The invention disclosed in the following Related Art Document discloses that the dielectric ceramic composition contains $B_2O_3$ with $BaTiO_3$ as a main ingredient, but does not disclose that a dielectric composition contains a compound represented by $xB_2O_3\text{-}(1\text{-}x)BaO$.

RELATED ART DOCUMENT

Japanese Patent Laid-open Publication No. 2001-089231

SUMMARY OF THE INVENTION

An aspect of the present invention provides a dielectric composition capable of being sintered at a relatively low temperature, and a multilayer ceramic electronic component manufactured using the dielectric composition.

According to an aspect of the present invention, there is provided a dielectric composition for low-temperature sintering, the dielectric composition including: $BaTiO_3$ as a main ingredient; and $xB_2O_3\text{-}(1\text{-}x)BaO$ as an accessory ingredient, wherein x ranges from 0.25 to 0.8, and the content of the accessory ingredient ranges from 0.1 to 2.00 mol %, based on 100 mol % of the main ingredient.

The dielectric composition may further include: 3.5 mol % of BaO; 3.2 mol % of $SiO_2$; and 1.0 mol % of $Al_2O_3$, as first auxiliary ingredients, based on 100 mol % of the main ingredient.

The dielectric composition may further include: 1.5 mol % of $Y_2O_3$; 1.0 mol % of $Mn_3O_4$; 5.0 mol % of $ZrO_2$; and 1.25 mol % of $V_2O_5$, as second auxiliary ingredients, based on 100 mol % of the main ingredient.

According to another aspect of the present invention, there is provided a multilayer ceramic electronic component including: a multilayer body formed by stacking a plurality of dielectric layers containing $BaTiO_3$ as a main ingredient and $xB_2O_3\text{-}(1\text{-}x)BaO$ as an accessory ingredient; first and second internal electrodes formed on upper surfaces of the dielectric layers to be alternately exposed to both end surfaces of the multilayer body and having different polarities; a first external electrode formed on one end surface of the multilayer body to thereby be electrically connected to the first internal electrode; and a second external electrode formed on a surface opposing the surface on which the first external electrode is formed to thereby be electrically connected to the second internal electrode, wherein x ranges from 0.25 to 0.8, and the content of the accessory ingredient ranges from 0.1 to 2.00 mol %, based on 100 mol % of the main ingredient.

The dielectric layer may have a thickness of 1 to 2 μm.

The dielectric layer may have a degree of densification of 97% or more.

The dielectric layer may further include: 3.5 mol % of BaO; 3.2 mol % of $SiO_2$; and 1.0 mol % of $Al_2O_3$, as first auxiliary ingredients, based on 100 mol % of the main ingredient.

The dielectric layer may further include: 1.5 mol % of $Y_2O_3$; 1.0 mol % of $Mn_3O_4$; 5.0 mol % of $ZrO_2$; and 1.25 mol % of $V_2O_5$, as second auxiliary ingredients, based on 100 mol % of the main ingredient.

According to another aspect of the present invention, there is provided a method of manufacturing a multilayer ceramic electronic component, the method including: preparing a dielectric composition for low-temperature sintering, containing $BaTiO_3$ as a main ingredient and $xB_2O_3\text{-}(1\text{-}x)BaO$ as an accessory ingredient; preparing a ceramic green sheet using the dielectric composition; forming an internal electrode on an upper surface of the ceramic green sheet; stacking and compressing the ceramic green sheets to prepare a ceramic multilayer body; and sintering the ceramic multilayer body, wherein x ranges from 0.25 to 0.8, and the content of the accessory ingredient ranges from 0.1 to 2.00 mol %, based on 100 mol % of the main ingredient.

The sintering of the ceramic multilayer body may be performed at 1050 to 1150° C.

The method may further include, after the sintering of the ceramic multilayer body, forming an external electrode electrically connected to the internal electrode on the ceramic multilayer body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
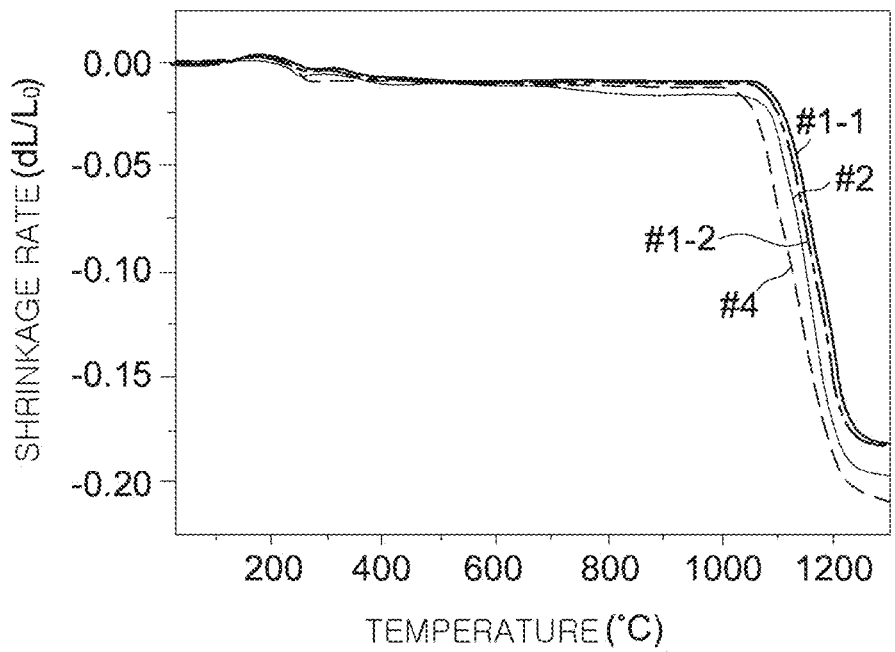
FIG. 1 is a graph illustrating a change in a shrinkage rate based on a temperature depending on the content of an accessory ingredient according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

In the accompanying drawings, an X-direction refers to a length direction, a y-direction refers to a width direction, and a z-direction refers to a height direction.

A multilayer ceramic electronic component according to an embodiment of the present invention may be appropriately used in a multilayer ceramic capacitor, a multilayer varistor, a thermistor, a piezoelectric element, a multilayer substrate, or the like, having a structure in which a dielectric layer formed of, for example, a ceramic layer is used and internal electrodes face each other, having the dielectric layer interposed therebetween.

Dielectric Composition for Low-Temperature Sintering

A dielectric composition for low-temperature sintering according to the embodiment of the present invention may include $BaTiO_3$ provided as a main ingredient; and $xB_2O_3$-$(1-x)BaO$ provided as an accessory ingredient.

The dielectric composition for low-temperature sintering according to the embodiment of the present invention may contain $BaTiO_3$ as the main ingredient.

$BaTiO_3$-based dielectric powder generally used in a ceramic electronic component may be used, and $(Ba_{1-a}Ca_a)TiO_3$, $Ba(Ti_{1-b}Ca_b)O_3$, $(Ba_{1-a}Ca_a)(Ti_{1-b}Zr_b)O_3$, or $Ba(Ti_{1-b}Zr_b)O_3$ in which $BaTiO_3$ is partially substituted with, for example, Ca, Zr, or the like, may be used, as well as $BaTiO_3$.

An average particle size of the $BaTiO_3$-based base material powder may be 0.05 to 0.5 μm, but is not limited thereto.

The dielectric composition for low-temperature sintering according to the embodiment of the present invention may contain $xB_2O_3$-$(1-x)BaO$ as the accessory ingredient.

In order to prepare the $xB_2O_3$-$(1-x)BaO$ used as the accessory ingredient, as a BaO-based material, $BaCO_3$ may be used, and as a $B_2O_3$-based material, $B_2O_3$ may be directly used or $H_3BO_3$ may be used as a starting material.

After the above-mentioned $BaCO_3$ and $B_2O_3$ or $H_3BO_3$ are weighed at a suitable ratio, they may be mixed with each other by a dry or wet (alcohol) method to then be dried.

Thereafter, in order to form $xB_2O_3$-$(1-x)BaO$, the temperature may be maintained at 500 to 700° C., which is a phase formation temperature.

A phase of the accessory ingredient may be changed according to a range of a composition ratio x.

Properties of $xB_2O_3$-$(1-x)BaO$ according to the composition ratio x are illustrated in the following Table 1.

TABLE 1

| | Composition ratio (x) | Phase | Liquid phase temperature (° C.) | Other properties |
|---|---|---|---|---|
| A* | 0.0 < x < 0.25 | $BaO$, $Ba_3B_2O_6$ | >1370 | Sintering temperature increase |
| B | 0.25 < x < 0.5 | $Ba_3B_2O_6$ + $αBaB_2O_4$ | <1150 | Sintering temperature decrease |
| C | 0.5 | $BaB_2O_4$ | 1105 | Sintering temperature decrease |
| D | 0.5 < x < 0.67 | $BaB_4O_7$ + $αBaB_4O_7$ | 899 | Sintering temperature decrease |
| E | 0.67 | $BaB_4O_7$ | 910 | Sintering temperature decrease |
| F | 0.67 < x < 0.80 | $BaB_4O_7$ + $BaB_8O_{13}$ | 869 | Sintering temperature decrease |
| G | 0.80 | $BaB_8O_{13}$ | 889 | Sintering temperature decrease |
| H* | x > 0.8 | $BaB_8O_{13}$ + Liquid | <878 | Densification decrease due to excessive liquid phase |

*Comparative Example

As illustrated in [Table 1], in the case in which the composition ratio x is 0.0 to 0.25, since the liquid phase temperature is higher than 1370° C., this accessory ingredient may not serve as an additive for low-temperature sintering.

Further, in the case in which the composition ratio x is more than 0.8, a $BaB_8O_{13}$ compound and an amorphous phase may coexist as a $B_2O_3$-rich compound at 878° C. or lower.

Therefore, it may be difficult to accurately control an amount of the liquid phase due to the amorphous phase.

The liquid phase is excessively formed, such that a swelling phenomenon may be generated during a sintering process, thereby decreasing densification.

Therefore, in order to enable the low-temperature sintering while preventing the swelling phenomenon from occurring, the composition ratio x of $xB_2O_3$-$(1-x)BaO$ in the dielectric composition for low-temperature sintering according to the embodiment of the present invention may be 0.25 to 0.8.

7 dielectric compositions as illustrated in the following Table 2 may be prepared by adjusting $xB_2O_3$-$(1-x)BaO$, an accessory ingredient.

TABLE 2

| Composition | Main ingredient (mol %) BaTiO$_3$ | Accessory ingredient (mol %, per 100 mol % of main ingredient) $xB_2O_3$—$(1-x)BaO$ | First auxiliary ingredient (mol %, per 100 mol % of main ingredient) BaO:SiO$_2$:Al$_2$O$_3$ | Second auxiliary ingredient (mol %, per 100 mol % of main ingredient) Y$_2$O$_3$:Mn$_3$O$_4$:ZrO$_2$:V$_2$O$_5$ |
|---|---|---|---|---|
| #1-1* | 100 | 0 | 3.5:3.2:1.0 | 1.5:1.0:5.0:1.25 |
| #1-2* | 100 | 0.05 | 3.5:3.2:1.0 | 1.5:1.0:5.0:1.25 |
| #2 | 100 | 0.1 | 3.5:3.2:1.0 | 1.5:1.0:5.0:1.25 |
| #3 | 100 | 0.3 | 3.5:3.2:1.0 | 1.5:1.0:5.0:1.25 |
| #4 | 100 | 0.7 | 3.5:3.2:1.0 | 1.5:1.0:5.0:1.25 |
| #5 | 100 | 1.1 | 3.5:3.2:1.0 | 1.5:1.0:5.0:1.25 |
| #6 | 100 | 2.0 | 3.5:3.2:1.0 | 1.5:1.0:5.0:1.25 |

*Comparative Example

As shown in [Table 2], the dielectric composition for low-temperature sintering according to the embodiment of the present invention may further include 3.5 mol % of BaO, 3.2 mol % of SiO$_2$, and 1.0 mol % of Al$_2$O$_3$ as the first auxiliary ingredients, based on 100 mol % of the main ingredient.

The first auxiliary ingredient, a sintering aid, may serve to assist in adjusting properties such as a sintering temperature, a degree of densification, IR, and the like.

In addition, the dielectric composition for low-temperature sintering according to the embodiment of the present invention may further include 1.5 mol % of Y$_2$O$_3$; 1.0 mol % of Mn$_3$O$_4$; 5.0 mole of ZrO$_2$; and 1.25 mol % of V$_2$O$_5$ as the second auxiliary ingredients, based on 100 mol % of the main ingredient.

The second auxiliary ingredient does not have a significant influence on permittivity and may suppress grain growth of the dielectric composition or control movement of oxygen vacancies to improve a sintering property, insulation resistance, an insulation breakdown voltage, an average lifetime, and the like.

FIG. 1 is a graph illustrating a change in a shrinkage rate based on a temperature depending on the content of an accessory ingredient according to an embodiment of the present invention.

FIG. 1 illustrates shrinkage behavior depending on the content of the accessory ingredient, provided by changing a temperature from room temperature to 1250° C. using a dilatometer.

It may be appreciated that in the cases of #1-1 and #1-2 in the graph of FIG. 1, there is little change in the shrinkage rate at a relatively low temperature, while rapid shrinkage behavior is initiated at a densification temperature (1112° C.) or more.

Meanwhile, in the case of #2 and #4, an initial shrinkage initiation temperature is decreased.

The following Table 3 shows densification temperatures of #1-1, #1-2, #2, and #4 shown in FIG. 1.

TABLE 3

|  | Densification temperature (° C.) |
|---|---|
| #1-1* | 1112 |
| #1-2* | 1110 |
| #2 | 1096 |
| #4 | 1066 |

A temperature at a portion in the graph of FIG. 1 at which a gradient of the graph sharply decreases may be defined as the densification temperature. As shown in Table 3, it may be appreciated that in dielectric compositions of #2 and #4, a minimum temperature at which densification is generated may be decreased by 30° C. or more as compared to dielectric compositions of #1-1 and #1-2, based on 100 mol % of the main component.

Figure 2:
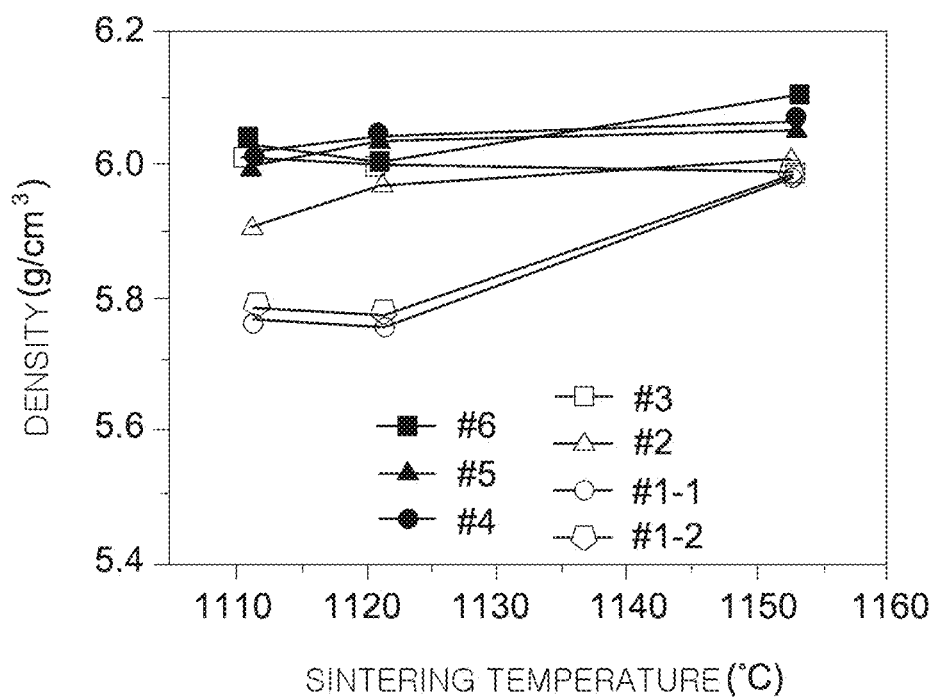
FIG. 2 is a graph illustrating a change in density based on a sintering temperature depending on the content of an accessory ingredient according to an embodiment of the present invention.

FIG. 2 is a graph illustrating a change in density based on a sintering temperature depending on the content of an accessory ingredient according to an embodiment of the present invention.

The results in FIG. 2 may be obtained by measuring density of ceramic bodies after manufacturing the ceramic bodies using respective compositions of #1 to 6 under the same condition.

Referring to FIG. 2, it may be appreciated that a difference in density between the compositions of #1 to 6 is not significantly great at a relatively high sintering temperature (>1150° C.) at which the densification may be sufficiently generated.

However, as the sintering temperature decreases, the dielectric compositions of #1-1 and #1-2 may have a significantly low density as compared to the dielectric compositions of #2 to #6.

That is, it may be appreciated that since a melting point of the $xB_2O_3$-$(1-x)BaO$ compound contained as the accessory ingredient is relatively low, sintering properties may be increased at a relatively low temperature and thus, the density may be increased.

That is, in the case in which the accessory ingredient is not included therein, the sintering may not be completely performed at a temperature lower than 1150° C., but the dielectric composition for low-temperature sintering according to the embodiment of the present invention contains the $xB_2O_3$-$(1-x)BaO$ compound as the accessory ingredient having a low melting point, such that complete sintering may be performed at a low temperature lower than 1150° C.

An active layer may refer to a portion in which an internal electrode affecting capacitance (performance) of an electronic component is formed, and a cover layer may refer to a portion in which it is formed on an external portion of the electronic component to affect product reliability.

Figure 3:
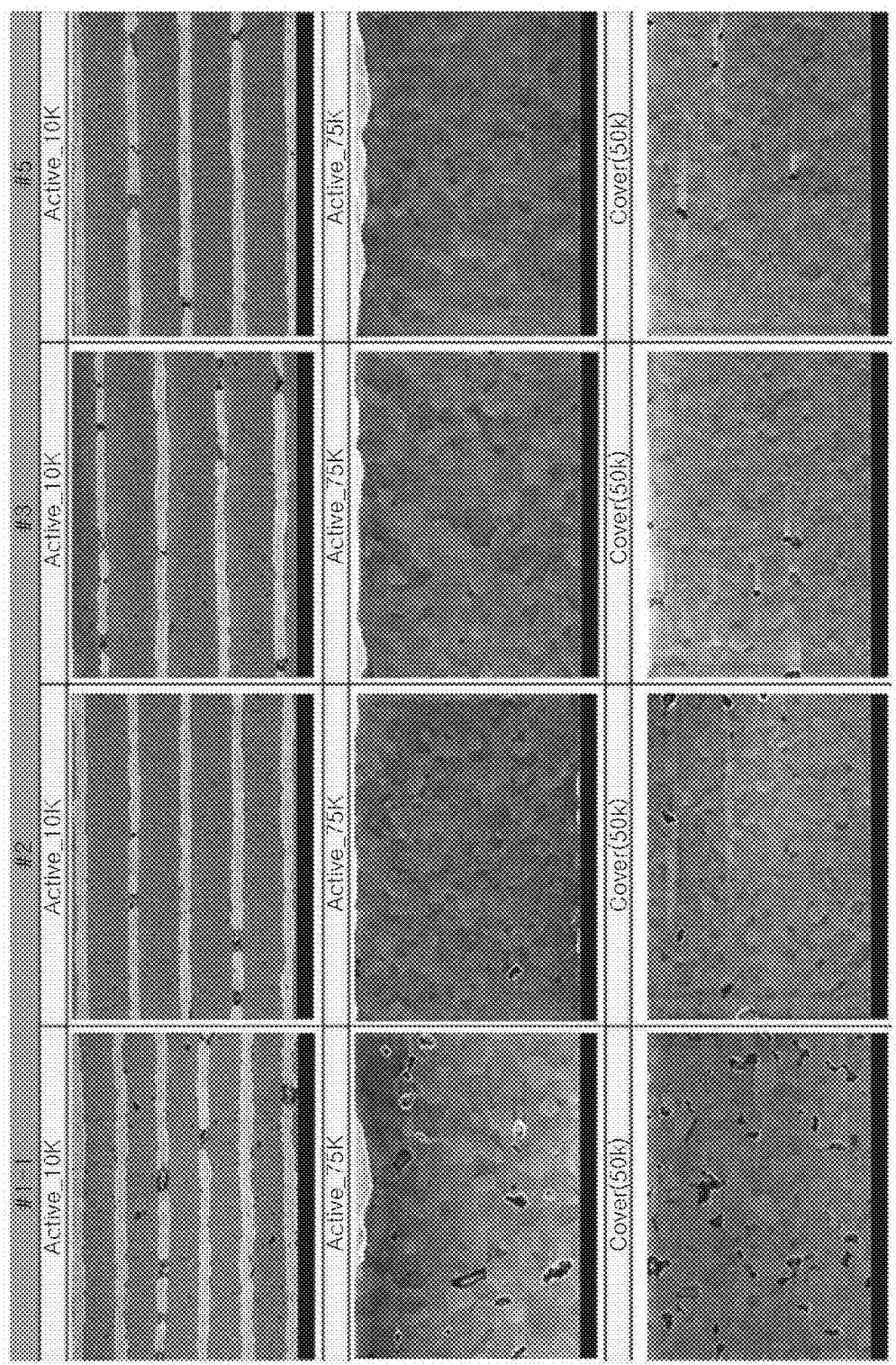
FIG. 3 shows images captured by a SEM, illustrating microstructures of cross sections of multilayer ceramic electronic components manufactured by changing the contents of the accessory ingredients according to an embodiment of the present invention.

Referring to FIG. 3, it may be confirmed that a relatively large amount of pores are formed as shown in a cross-section of a multilayer ceramic electronic component manufactured using the dielectric composition of #1-1) that does not contain the accessory ingredient.

Black portions in the microstructure corresponding to #1-1 in FIG. 3 may be portions in which the pores are formed. It may be appreciated that portions indicated as black in microstructures corresponding to #2, #3, and #5 are gradually decreased.

In the case in which the pores are generated in the active layer, the pores may directly affect a decrease in capacitance, and in the case in which an internal electrode paste contact an internal electrode adjacent thereto through the pore during a process of manufacturing the multilayer ceramic electronic component, a short-circuit may occur.

That is, the pore in the active layer may deteriorate the capacitance (performance) and reliability of the electric component.

In addition, the pore present in the cover layer may become a path through which a conductive foreign material flows into the electronic component, which may cause breakdown of the electronic components due to cracks.

Therefore, in the case of containing the $xB_2O_3$-$(1-x)BaO$ compound as the accessory ingredient, the capacitance and reliability may be improved by suppressing generation of pores.

Figure 4:
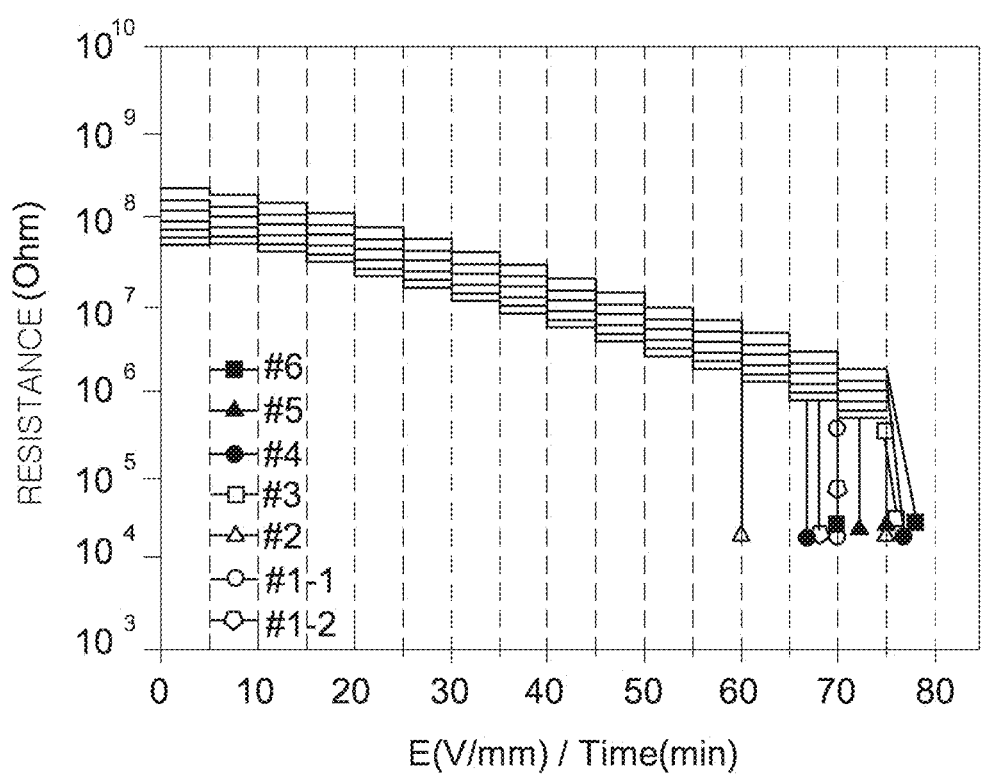
FIG. 4 is a graph illustrating a change in high-temperature insulation resistance (IR), based on an electric field, depending on the content of an accessory ingredient according to an embodiment of the present invention.

FIG. 4 is a graph illustrating a change in high-temperature insulation resistance (IR), based on an electric field, depending on the content of an accessory ingredient according to an embodiment of the present invention In order to confirm the reliability of the respective dielectric compositions, step-IR may be evaluated at a high temperature (150° C.), and the results are shown in FIG. 4.

Referring to FIG. 4, it may be appreciated that in the case of containing the $xB_2O_3$-$(1-x)BaO$ compound as the accessory ingredient, as the accessory ingredient is increased, the composition may be stable until a high electric field is applied.

In addition, it is shown that the reliability at a high temperature may not be deteriorated by an increase of the accessory ingredient.

The reason is that since the $xB_2O_3$-$(1-x)BaO$ compound contained as the accessory ingredient has a relatively low melting point, an insulation property may be improved.

Referring to the graphs in FIGS. 1 through 4, in order to decrease a sintering temperature without degrading performance and reliability, the $xB_2O_3$-$(1-x)BaO$ compound contained as the accessory ingredient may be contained in an amount of 0.1 to 2.0 mol % based on 100 mol % of the main component.

Based on 100 mol % of the main component, in the case in which the content of the accessory ingredient is less than 0.1 mol %, it may be difficult to lower the sintering temperature, and in the case in which the content thereof is more than 2.0 mol %, pores may be formed due to an excessive amount of liquid phase, such that densification may be deteriorated, and a non-uniform microstructure may be formed.

Multilayer Ceramic Electronic Component and Method of Manufacturing the Same

Figure 5:
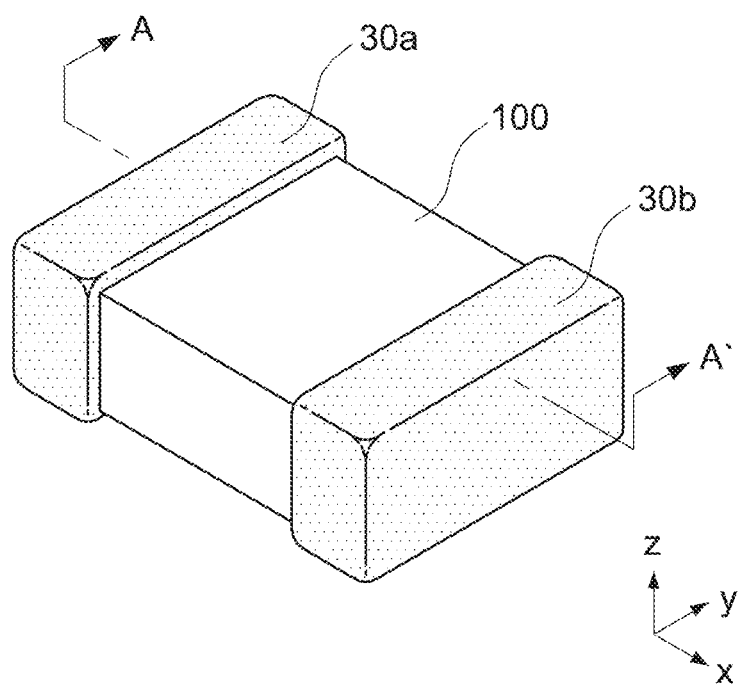
FIG. 5 is a perspective view of a multilayer ceramic electronic component according to another embodiment of the present invention.
Figure 6:
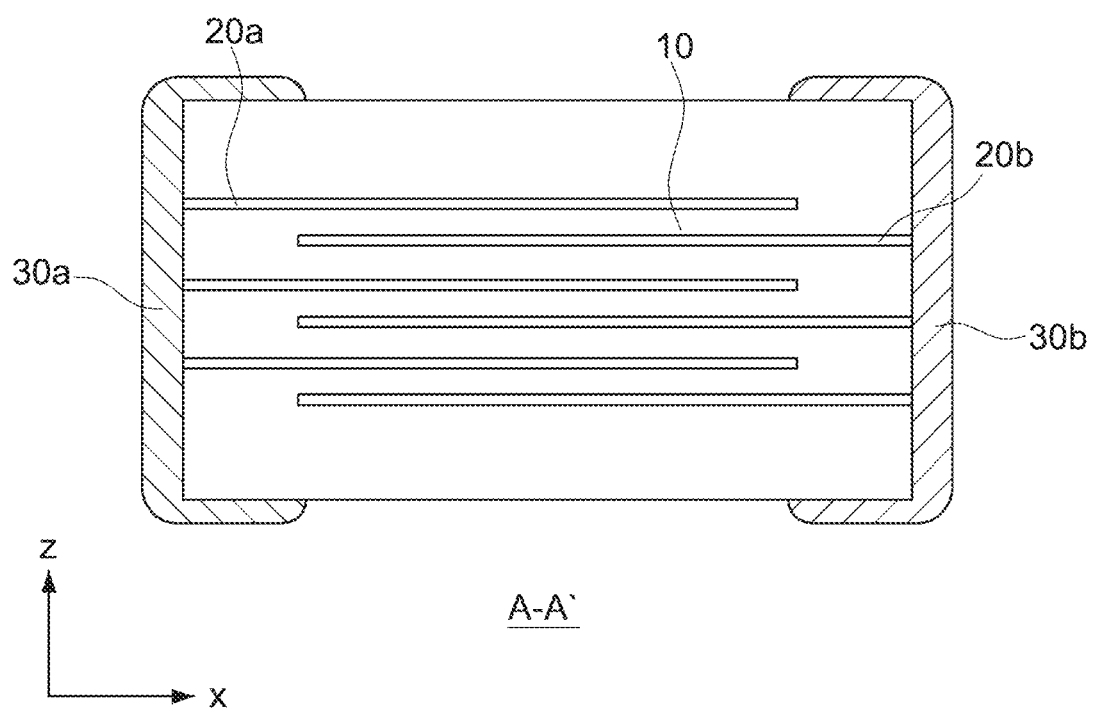
FIG. 6 is a cross-sectional view taken along line A-A' of FIG. 5.

FIG. 5 is a perspective view of a multilayer ceramic electronic component according to another embodiment of the present invention, and FIG. 6 is a cross-sectional view taken along line A-A' of FIG. 5.

Referring to FIGS. 5 and 6, the multilayer ceramic electronic component according to another embodiment of the present invention may include a multilayer body 100 formed by stacking a plurality of dielectric layers 10 containing $BaTiO_3$ as a main ingredient and $xB_2O_3$-$(1-x)BaO$ as an accessory ingredient; first and second internal electrodes 20a and 20b formed on upper surfaces of the dielectric layers to be alternately exposed to both end surfaces of the multilayer body and having different polarities; a first external electrode 30a formed on one end surface of the multilayer body 100 to thereby be electrically connected to the first internal electrode 20a; and a second external electrode 30b formed on a surface opposing the surface on which the first external electrode 30a is formed to thereby be electrically connected to the second internal electrode 20b.

The dielectric layer 10 may be formed using the above-mentioned dielectric composition for low-temperature sintering.

That is, the dielectric composition for low-temperature sintering according to the embodiment of the present invention is used, such that the sintering may be performed at a temperature lower than a temperature at which a nickel internal electrode is oxidized or agglomerated.

According to the related art, the dielectric layer 10 having a predetermined thickness or less may not be manufactured due to a short-circuit caused by an agglomeration phenomenon of the nickel internal electrode at a relatively high temperature.

However, in the multilayer ceramic electronic component according to the embodiment of the present invention, since the dielectric layer may be formed using the dielectric composition for low-temperature sintering and sintered at a relatively low temperature, the agglomeration phenomenon of the nickel internal electrode may be significantly decreased.

Accordingly, even in a case in which the dielectric layer 10 has a relatively thin thickness, the reliability may not be deteriorated, and high capacitance (high performance) may be secured.

Therefore, in another embodiment of the present invention, the thickness of the dielectric layer 10 may be 1 to 2 μm.

In the case in which the thickness of the dielectric layer 10 is less than 1 μm, the internal electrodes 20a and 20b adjacent to each other may contact each other, such that the short-circuit may occur, and in the case in which the thickness of the dielectric layer 10 is more than 2 μm, it may be difficult to secure ultra-high capacitance.

A degree of densification of the dielectric layer may be 97% or more

According to the related art, when a ceramic green sheet is sintered at 1050 to 1150° C., a degree of density is decreased to below 97%.

However, in the dielectric layer 10 according to the embodiment of the present invention, the degree of densification of 97% or more may be secured using the dielectric composition for low-temperature sintering.

The first internal electrode 20a may be formed on an upper surface of the dielectric layer 10 to be electrically connected to the first external electrode 30a.

In addition, the second internal electrode 20b may be formed on an upper surface of the dielectric layer 10 to be electrically connected to the second external electrode 30b.

The multilayer body 100 may be formed by alternately stacking the dielectric layer 10 including the first internal electrode 20a formed thereon and the dielectric layer 10 including the second internal electrode 20b formed thereon.

For example, the first and second internal electrodes 20a and 20b may have different polarities from each other by connecting a positive (+) voltage to the first external electrode 30a and connecting a negative (−) voltage to the second external electrode 30b.

Therefore, dipoles may be formed in the dielectric layers 10 between the first and second internal electrodes 20a and 20b, such that the multilayer ceramic electronic component according to the embodiment of the present invention may act as a capacitor.

The first and second external electrodes 30a and 30b may be formed both end surface of the multilayer body in the length direction thereof, respectively.

Figure 7:
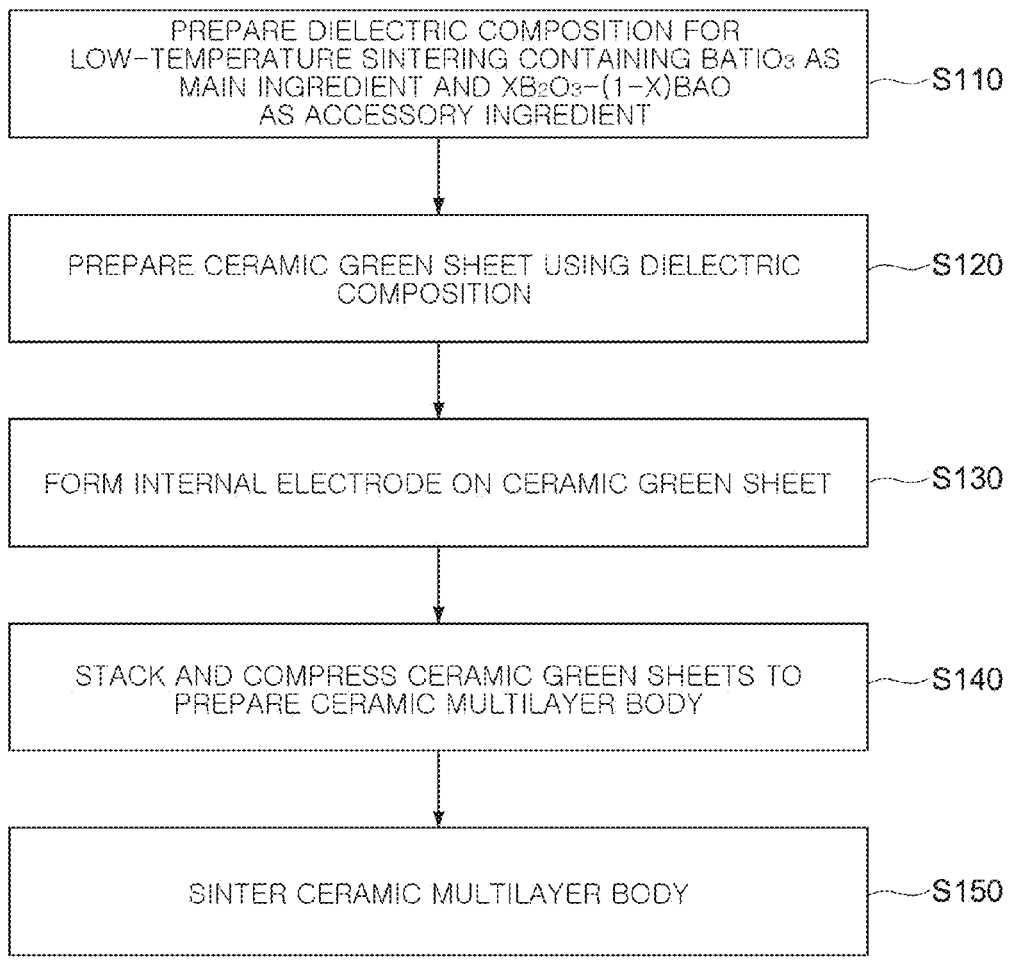
FIG. 7 is a schematic flow chart illustrating a method of manufacturing a multilayer ceramic electronic component according to another embodiment of the present invention.

FIG. 7 is a schematic flow chart showing a method of manufacturing a multilayer ceramic electronic component according to another embodiment of the present invention.

Referring to FIG. 7, the method of manufacturing a multilayer ceramic electronic component according to another embodiment of the present invention may include: preparing a dielectric composition for low-temperature sintering, containing $BaTiO_3$ as a main ingredient and $xB_2O_3$-$(1-x)BaO$ as an accessory ingredient (S110); preparing a ceramic green sheet using the dielectric composition (S120); forming an internal electrode on an upper surface of the ceramic green sheet (S130); stacking and compressing the ceramic green sheets to prepare a ceramic multilayer body (S140); and sintering the ceramic multilayer body (S150).

In the preparing of the dielectric composition (S110), in order to prepare the $xB_2O_3$-$(1-x)BaO$ used as the accessory ingredient, as a BaO-based material, $BaCO_3$ may be used, and as a $B_2O_3$-based material, $B_2O_3$ may be directly used or may be used as a starting material.

After the above-mentioned $BaCO_3$ and $B_2O_3$ or $H_3BO_3$ may be weighed at a suitable ratio, they may be mixed with each other and then dried by a dry or wet (alcohol) method.

Thereafter, in order to form $xB_2O_3$-$(1-x)BaO$, the temperature may be maintained at 500 to 700° C., a phase formation temperature.

In the preparing of the ceramic green sheet (S120), the ceramic green sheet may be manufactured by mixing the dielectric composition for low-temperature sintering, a binder, and a solvent with each other to prepare slurry and manufacturing the prepared slurry in a sheet shape having a thickness of several μm by a doctor blade method.

In addition, the internal electrode may be formed on the ceramic green sheet using a conductive paste (S130).

The internal electrode may be formed of a conductive paste composition containing conductive metal powder.

The conductive metal powder is not particularly limited. For example, silver (Ag), lead (Pg), platinum (Pt), nickel (Ni), copper (Cu), or the like, may be used alone, or a mixture of at least two thereof may be used.

After the internal electrode layer is formed as described above, a ceramic multilayer body may be formed by separating the ceramic green sheet from a carrier film and then stacking a plurality of ceramic green sheets on each other, so as to be overlapped with each other (S140).

Thereafter, the formed ceramic multilayer body may be compressed, sintered, cut, and polished, thereby manufacturing a ceramic multilayer body (S150).

In the multilayer ceramic electronic component according to the embodiment of the present invention, since the dielectric composition for low-temperature sintering is used, the sintering may be performed at 1050 to 1150° C.

Therefore, the agglomeration phenomenon or oxidation of the internal electrode may be prevented, whereby the capacitance (performance) and reliability of the multilayer ceramic electronic component may be improved.

After the sintering of the ceramic multilayer body (S150) is performed, forming an external electrode electrically connected to the internal electrode on the ceramic multilayer body may be further included.

The external electrodes may be formed on both end surfaces of the ceramic multilayer body in the length direction thereof, that is, both end surfaces to which the internal electrodes are exposed, using a conductive paste.

As set forth above, the dielectric composition for low-temperature sintering according to the embodiment of the present invention contains $BaTiO_3$ as the main ingredient and $xB_2O_3$-$(1-x)BaO$ as the accessory ingredient to thereby decrease the sintering temperature, such that the dielectric composition may be sintered at a relatively low temperature and may also have the dense microstructure and excellent dielectric properties at a low temperature.

In addition, in the method of manufacturing a multilayer ceramic electronic component according to the embodiment of the present invention, the sintering may be performed at 1050 to 1150° C. by using the dielectric composition for low-temperature sintering according to the embodiment of the present invention, whereby the agglomeration phenomenon of the nickel internal electrode may be prevented.

Further, the multilayer ceramic electronic component containing the dielectric composition for low-temperature sintering according to the embodiment of the present invention may have a high degree of densification, such that high capacitance may be obtained, and the agglomeration phenomenon of the nickel internal electrode may be prevented by decreasing the sintering temperature, thereby securing high reliability.

While the present invention has been shown and described in connection with the embodiments, it will be apparent to those skilled in the art that modifications and variations can be made without departing from the spirit and scope of the invention as defined by the appended claims.

What is claimed is:

1. A dielectric composition for low-temperature sintering, the dielectric composition comprising:
   $BaTiO_3$ as a main ingredient; and
   $xB_2O_3$-$(1-x)BaO$ as an accessory ingredient,
   wherein x ranges from 0.25 to 0.67, and the content of the accessory ingredient ranges from 0.1 to 2.00 mol %, based on 100 mol % of the main ingredient, and
   the accessory ingredient includes at least one phase among the group consisting of $\alpha BaB_2O_4$ and $\alpha BaB_4O_7$ phases.

2. The dielectric composition of claim 1, further comprising:
   3.5 mol % of BaO;
   3.2 mol % of $SiO_2$; and
   1.0 mol % of $Al_2O_3$, as first auxiliary ingredients, based on 100 mol % of the main ingredient.

3. A dielectric composition for low-temperature sintering, the dielectric composition comprising:
   $BaTiO_3$ as a main ingredient; and
   $xB_2O_3$-$(1-x)BaO$ as an accessory ingredient,
   wherein x ranges from 0.25 to 0.67, and the content of the accessory ingredient ranges from 0.1 to 2.00 mol %, based on 100 mol % of the main ingredient, the accessory ingredient includes at least one phase among the group consisting of $\alpha BaB_2O_4$ and $\alpha BaB_4O_7$ phases, and further comprising:
   1.5 mol % of $Y_2O_3$;
   1.0 mol % of $Mn_3O_4$;
   5.0 mol % of $ZrO_2$; and
   1.25 mol % of $V_2O_5$, as second auxiliary ingredients, based on 100 mol % of the main ingredient.

4. A multilayer ceramic electronic component comprising:
   a mulilayer body formed by stacking a plurality of dielectric layers containing $BaTiO_3$ as a main ingredient and $xB_2O_3$-$(1-x)BaO$ as an accessory ingredient;

first and second internal electrodes formed on upper surfaces of the dielectric layers to be alternately exposed to both end surfaces of the multilayer body;

a first external electrode formed on one end surface of the multilayer body to thereby be electrically connected to the first internal electrode; and a second external electrode formed on a surface opposing the surface on which the first external electrode is formed to thereby be electrically connected to the second internal electrode, wherein x ranges from 0.25 to 0.67, and the content of the accessory ingredient ranges from 0.1 to 2.00 mol %, based on 100 mol % of the main ingredient, and the accessory ingredient includes at least one phase among the group consisting of $\alpha BaB_2O_4$ and $\alpha BaB_4O_7$ phases.

5. The multilayer ceramic electronic component of claim 4, wherein the dielectric layer has a thickness of 1 to 2 μm.

6. The multilayer ceramic electronic component of claim 4, wherein the dielectric layer has a degree of densification of 97% or more.

7. The multilayer ceramic electronic component of claim 4, wherein the dielectric layer further includes:

3.5 mol % of BaO;

3.2 mol % of $SiO_2$; and 1.0 mol % of $Al_2O_3$, as first auxiliary ingredients, based on 100 mol % of the main ingredient.

8. The multilayer ceramic electronic component of claim 4, the dielectric layer further includes:

1.5 mol % of $Y_2O_3$;

1.0 mol % of $Mn_3O_4$;

5.0 mol % of $ZrO_2$; and 1.25 mol % of $V_2O_5$, as second auxiliary ingredients, based on 100 mol % of the main ingredient.

\* \* \* \* \*